United States Patent [19]
Wehler et al.

[11] Patent Number: 5,157,913
[45] Date of Patent: Oct. 27, 1992

[54] GUIDE CHAIN FOR GUIDING ENERGY LINES

[75] Inventors: Herbert Wehler, Neunkirchen; Paul-Werner Mack, Wenden; Willibald Weber, Netphen, all of Fed. Rep. of Germany

[73] Assignee: Kabelschlepp GmbH, Fed. Rep. of Germany

[21] Appl. No.: 839,579

[22] Filed: Feb. 21, 1992

[30] Foreign Application Priority Data

Feb. 22, 1991 [DE] Fed. Rep. of Germany ....... 4105653

[51] Int. Cl.$^5$ ............................................. F16G 13/16
[52] U.S. Cl. ..................................... 59/78.1; 248/49; 59/900
[58] Field of Search ............................ 59/78, 78.1, 900; 248/49, 50, 51, 52, 78

[56] References Cited

U.S. PATENT DOCUMENTS

| | | | |
|---|---|---|---|
| 4,570,437 | 2/1986 | Moritz | 59/78.1 |
| 4,590,961 | 5/1986 | Schumann | 59/78.1 |
| 4,769,985 | 9/1988 | Moritz | 59/78.1 |
| 4,807,432 | 2/1989 | Mauri | 59/78.1 |

FOREIGN PATENT DOCUMENTS

| | | | |
|---|---|---|---|
| 0286442 | 10/1988 | European Pat. Off. | 59/78.1 |
| 3318365 | 5/1987 | Fed. Rep. of Germany . | |
| 3714056 | 8/1988 | Fed. Rep. of Germany . | |
| 8910217 | 8/1989 | Fed. Rep. of Germany . | |
| 3709740 | 5/1991 | Fed. Rep. of Germany . | |

*Primary Examiner*—David Jones
*Attorney, Agent, or Firm*—Robert W. Becker & Associates

[57] ABSTRACT

A guide chain for guiding energy lines from a stationary connection to a movable consuming device is comprised of a plurality of chain members being pivotably connected to one another. Each of the chain members is comprised of two side portions arranged at a distance parallel to one another. Two transverse elements connect the two side portions with one another. In order to open the guide chain at its upper side on either side of the side portions for providing access to the energy line channel, the two side portions are provided with a pivot joint which is comprised of a lug element extending in the longitudinal direction of the side portion and a holding member which is detachably connected to the lug element, the transverse element being connected to the two holding members.

11 Claims, 5 Drawing Sheets

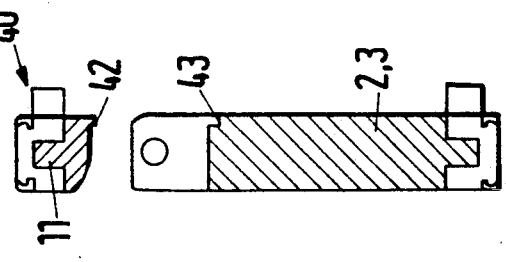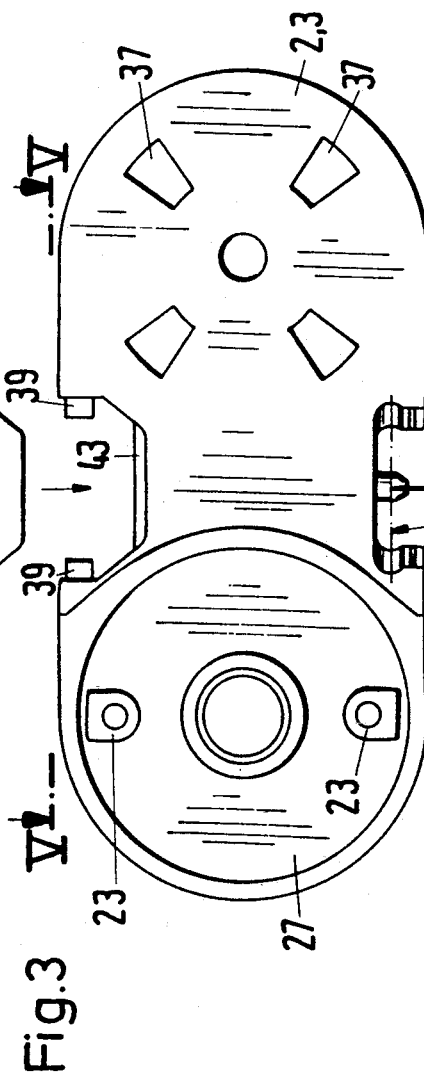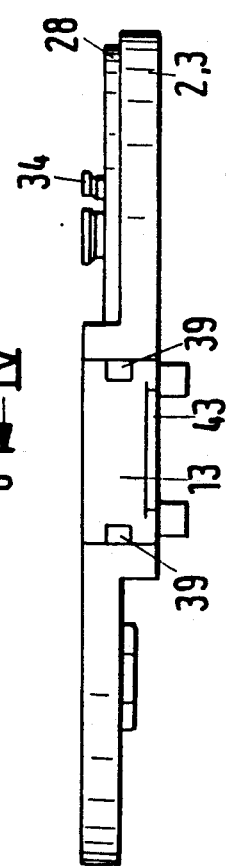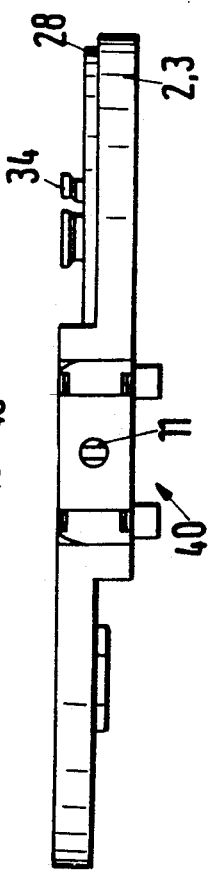

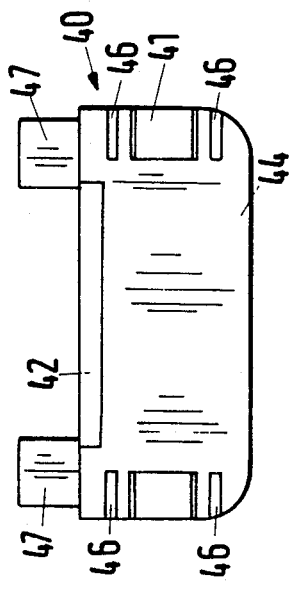
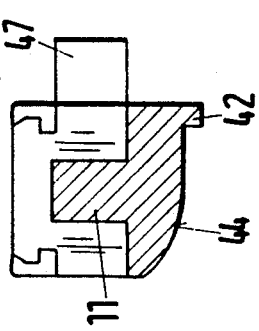
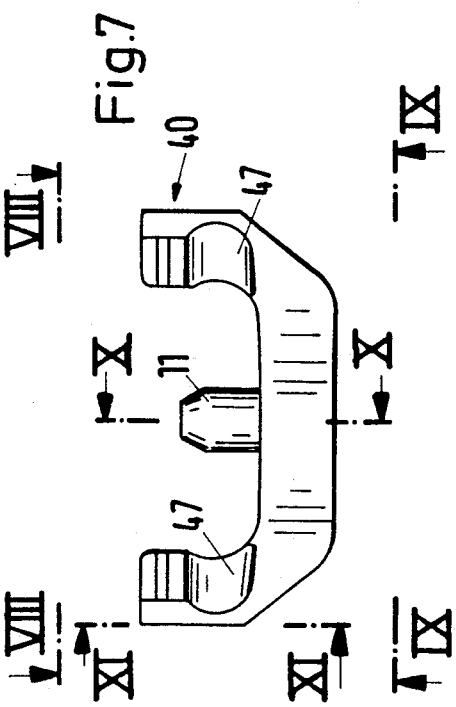
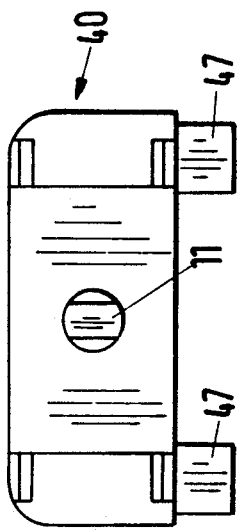
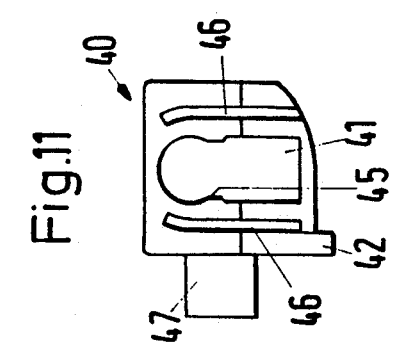

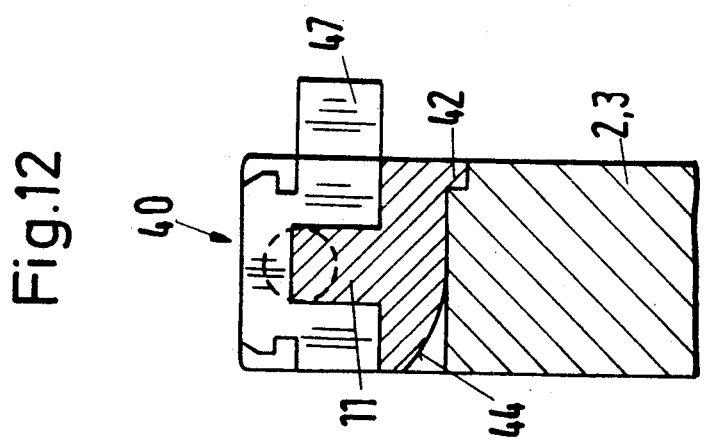
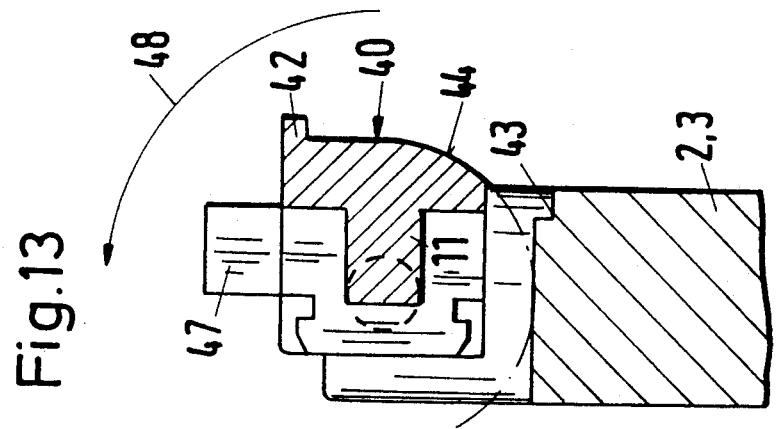
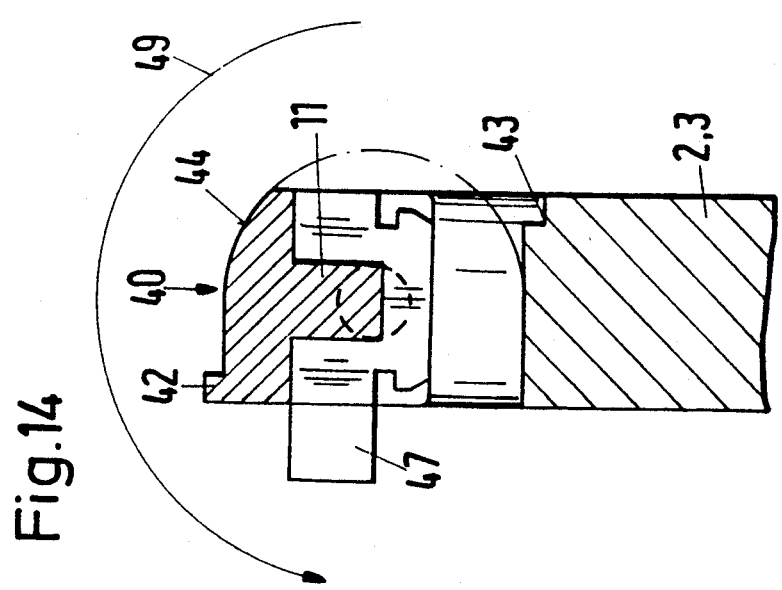

GUIDE CHAIN FOR GUIDING ENERGY LINES

BACKGROUND OF THE INVENTION

The present invention relates to a guide chain for guiding energy lines, especially electric cable or hoses, from a stationary connection to a movable consuming device whereby the guide chain is comprised of a plurality of chain members, each chain member being comprised of two side portions that are arranged at a distance parallel to one another and two transverse elements connecting the side portions with one another, with at least one transverse element being connected to one of the side portions as to be pivotable about a pivot axis.

A guide chain of the aforementioned kind, for example, is known from German patent 33 18 365. This known guide chain is comprised of a one-piece and form stable U-shaped receiving portion having legs provided with cover plates with abutments for limiting the relative pivot angle. One side of the cover plates is connected with an integral one-piece transverse element, while a further transverse element is comprised of a separate closing element which connects the free ends of the cover plate with one another. This closing element is connected with a releasable hinge at one of the cover plates and is lockable at the other cover plate with an elastic hook. The hinge is comprised of an exposed hinge spindle which is integrally connected to the free edge of one of the cover plates and has, viewed in a direction perpendicular to the cover plate, a flattened circular cross-section with rounded narrow sides. It further comprises a cutout at the end of the closing element, the cutout having undercuts and being arc-shaped. This embodiment allows the closing element after being clamped onto the hinge spindle and pivoted in the direction towards the oppositely arranged cover plate, to be clamped in a frictional and form-locking manner to the hinge spindle.

This known guide chain has been employed successfully for guiding energy lines. It is advantageous that the guide chain may be easily opened by pivoting the closing element so that the energy line channel is easily accessible from one side.

A guide chain of the aforementioned kind is furthermore known from German patent 37 14 056, the guide chain being comprised of a plurality of pivotably connected chain members which are provided in the form of injection molded parts made of an elastic plastic material and having two side portions and two transverse elements. At least one of the transverse elements, i.e., the upper transverse element, is provided with catch elements at its end faces which are detachably connectable to the corresponding catch receiving means at the side portions. In this known guide chain, at least one portion of a pivot joint is integrally connected to the transverse element so that the interior of the individual chain member is accessible only by pivoting this transverse element about its pivoting point. Accordingly, an opening of the chain members is only possible when sufficient space for pivoting the transverse element is present.

Another guide chain of the aforementioned kind is known from the German patent 37 09 740 which has chain members of a U-shaped cross-section. The U-shaped parts are comprised of two side portions and one transverse element connecting the two side portions. Furthermore, this known guide chain is provided with a pivotable arm that is connected to the two side portions. This arm, at its two free ends, is provided with a respective pair of outwardly oriented journal pins which engage respective bores serving as journal eyes and which are oriented in the longitudinal direction of the side portions. The arm is furthermore provided with slots extending inwardly from its free ends. These slots form two legs at the free ends the journal pins being connected to the end faces of these legs. These slots delimit middle sections which, relative to the center axis of the arms, are shorter than the legs so that a free space at the ends of the middle portions is created. The respectively inner ends of the legs, respectively, of the middle portions end, due to the slots, at the same elevation and have a transition into a central section which corresponds to the entire width of the arm. In order to release the arm it is necessary to firs bend one of the middle portions relative to the central plane out of a normal position, whereby the legs adjacent to the respective middle portions are moved relative to one another so that they are forced out of the corresponding bores. With the known guide chain, it is disadvantageous that the opening of the individual chain members is rather difficult and possible only with the aid of respective tools.

It is therefore an object of the present invention to provide a guide chain of the aforementioned kind which may be opened at least at its upper side at both side portions in order to provide unhindered access to the energy line channel without having to disassemble the holding means at the side portions.

BRIEF DESCRIPTION OF THE DRAWINGS

This object, and other objects and advantages of the present invention, will appear more clearly from the following specification in conjunction with the accompanying drawings, in which:

FIG. 3 shows a side view of a side portion with the pivot joint according to FIG. 2;

FIG. 4 shows the side portion according to FIG. 3 in a cross-sectional view along the line IV—IV;

FIG. 5 shows the side portion according to FIGS. 3 and 4 in a plan view along the line V—V;

FIG. 6 shows the side portion according to FIGS. 3 to 5 in a plan view along the line VI—VI;

FIG. 7 shows a holding member in a side view;

FIG. 8 shows the holding member according to FIG. 7 in a plan view along the line VIII—VIII;

FIG. 9 shows the holding member according to FIGS. 7 and 8 in a plan view along the line IX—IX;

FIG. 10 shows the holding member according to FIGS. 7 to 9 in a cross-sectional view along the line X—X;

FIG. 11 shows the holding member according to FIGS. 7 to 10 in a side view along the line XI—XI;

FIG. 12 is a side portion with the holding member according to FIGS. 7 to 11 in a cross-sectional side view;

FIG. 13 is the side portion according to FIG. 12 with the holding member being pivoted 90°; and FIG. 14 shows the side portion according to FIG. 12 with the holding member pivoted 180°.

SUMMARY OF THE INVENTION

Figure 1:
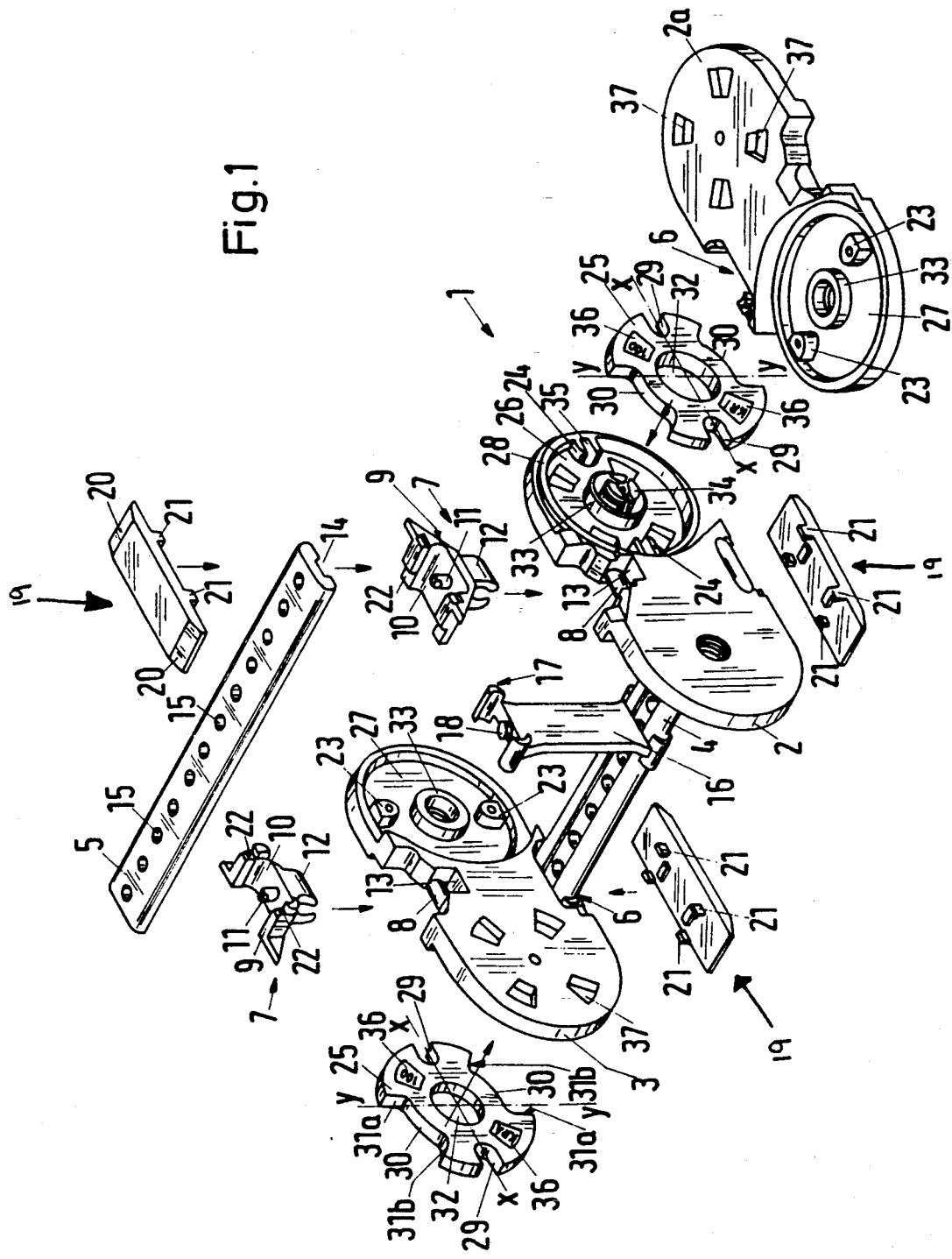
FIG. 1 is a guide chain with a pivot joint of a first embodiment in a perspective exploded view.

The guide chain of the present invention is primarily characterized by a plurality of chain members being pivotably connected to one another whereby each one of the chain members is comprised of: Two side portions arranged at a distance parallel to one another; two transverse elements connecting the side portions with one another; at least two pivot joints, a first one of said pivot joints fastened to a first one of the side portions and a second one of the pivot joints fastened to a second one of the side portions, for pivotably connecting at least one of the transverse elements to the side portions, the pivot joints each comprising a lug element, extending in a longitudinal direction of the side portions and forming a pivoting axis of the pivot joint, and a holding member connected in a detachable manner to the lug element, the holding member having a U-shaped cutout with undercuts for receiving the transverse element, the transverse element being inserted into the U-shaped cutout with a rotating movement.

According to the present invention, the two side portions are provided with pivot joints which are comprised of a lug element which is arranged in the longitudinal direction of the side portions and a holding member which is detachably connectable to the lug element, whereby the holding member is provided with a U-shaped cutout having undercuts, the transverse element being connected to both holding members such that the transverse element is inserted into the cutout with a rotating movement.

The chain members of the present invention have the advantage that they may be opened easily by removing one of the holding members, holding the transverse elements, from the lug element which forms the pivoting axis and pivoting the transverse element together with the holding member about the lug element of the second side portion. An opening in this manner is expedient when sufficient space is present which allows the pivoting of the transverse element about the lug element of one of the side portions. The chain members of guide chains are opened frequently for service purposes or in order to supplement or remove respective energy lines. With the inventive guide chain two options regarding the opening procedure are provided. First, the guide chain may be opened by pivoting the transverse element as described above. However, it is also possible to open the guide chain such that the transverse element is rotated and thus removed from both holding members without the holding members being released from the lug elements which form the pivoting axis. This second manner of opening the guide chain may be used when the surrounding space is limited and does not allow the pivoting of the transverse element about the pivoting axis. Furthermore, in this manner it is possible without problems to exchange the transverse element in the inventive guide chain without removing the holding members which are part of the pivot joint. This is advantageous because the exchange of transverse elements of the inventive guide chain is inexpensively achieved by the respective user/owner of the guide chain. A further advantage of the inventive guide chain is that the guide chain may be provided with different interchangeable transverse elements. A retro-fitting of the guide chain with different transverse elements is thus possible without exchanging, respectively, altering the pivot joints which are very expensive in their manufacture, because in the inventive embodiment the pivot joints, which are comprised of the lug elements which are integrated into the side portions and the holding member which is detachably mountable on the lug elements, are components separate from the transverse elements.

It is expedient that the side portions have a V-shaped cutout in which the lug element is arranged. Furthermore, it is preferable that the holding member is V-shaped and has a spring clip at a bottom side thereof for fastening the holding member to the lug element. The holding member may be outwardly pivotable about the lug element relative to the chain member at an angle of greater than 90°.

In another embodiment of the present invention the side portions have V-shaped cutouts and the lug element is comprised of two individual fastening lugs attached to opposite inner surfaces of the V-shaped cutout whereby the holding member has two recesses with undercuts corresponding to the fastening lugs. Preferably the holding member is U-shaped. The holding member further comprises an extension and the cutout further comprises a step, whereby the extension engages this step. It is preferred that an underside of the holding member, i.e. the side facing the side portions, has a contour corresponding to an arc segment. The holding element is preferably pivotable about the fastening lugs at an angle of between 90° and 240°. Preferably the angle is 180°.

It is advantageous that the U-shaped cutout of the holding member is provided with a pin and the transverse elements are provided with bores, whereby the pin engages one of the bores of the transverse elements.

As disclosed above, it is advantageous to arrange the lug elements in the V-shaped cutouts of the side portions so that the side portions, due to the integration of the lug elements, have no protruding parts which extend past the outer contour of the guide chain. The holding members are also V-shaped and at their underside, are provided with a spring clip which is clamped onto the lug element. This embodiment has the advantage that the holding members completely fill the V-shape cutout of the side portions so that no soiling of the enclosed energy line channel may occur. Especially the introduction of metal particles is prevented. It is furthermore advantageous that the holding member may be simply clamped or removed from the lug element with the aid of the spring clip. This results in a very simple handling of the guide chain and also allows the complete removal of the holding member with the attached transverse elements. The holding members and the spring clips are preferably manufactured from plastic material having a sufficient elasticity so that the spring clips withstand multiple opening procedures of the guide chain and will still tightly clamp to the lug elements after multiple applications, thereby preventing an accidental opening of the individual chain members.

The holding member is preferably pivotable about an angle of 90° about the lug element towards the outside of the side portions. Due to this embodiment, the transverse element may be pivoted to such an extent that the energy line channel is easily accessible.

In the second embodiment described above, the oppositely arranged inner surfaces of the cutouts of the side portions are provided with two fastening lugs whereby the holding member is provided with two cutouts having undercuts which correspond to the fastening lugs. This embodiment allows the application of various holding members which, depending on the desired application, may be V-shaped or U-shaped. A further advantage of this embodiment is that the pivoting range of each holding member about the two fastening lugs is great. Furthermore, this embodiment is also applicable for small-size guide chains.

In order to facilitate the assembly of the guide chain, it is provided that the holding member have an extension which engages a corresponding step at the cutout of the side portion. When assembling the guide chain, the holding member is inserted into the cutout and pivoted such that the extension engages the corresponding step of the cutout in the side portion. In this position the transverse element may be attached to the oppositely arranged holding member.

An easy and friction-free pivotability of the holding member is achieved by providing the underside of the holding member in the form of an arc segment.

DESCRIPTION OF PREFERRED EMBODIMENTS

The present invention will now be described in detail with the aid of several specific embodiments utilizing FIGS. 1 through 14.

A chain member 1 is comprised of two side portions 2 and 3 which are arranged at a distance parallel to one another and which are connected to one another by transverse elements 4 and 5, thus enclosing an energy line channel. The transverse element 4, over its entire length, has a flattened cross-section with rounded narrow sides and may be inserted into cutouts 6, provided with undercuts, of the narrow sides of the side portions 2 and 3, whereby the transverse element 4 is connected in a frictional and form-locking manner to the cutouts 6 of the side portions 2 and by performing a rotating insertion about its longitudinal axis. The transverse element 5 is also provided with a flattened cross-section over its entire length and with rounded narrow sides. It may be mounted in a pivotable manner on respective pivot joints 7 provided at the narrow sides of the side portions 2 and 3.

The pivot joints 7 are comprised of a lug element 8 arranged within the side portions 2, 3 and a holding member 9 which is pivotably clamped onto the lug element 8, the holding member 9 having an essentially U-shaped cutout 10. The cutout 10, in which the transverse element 5 is mounted in a frictional and form-locking manner by a rotational insertion about its longitudinal axis and connected to the holding member 9 is provided with a pin 11. The holding member 9 is further provided with a spring clip 12 at its underside with which the holding member 9 is clamped onto the lug element 8. The lug element 8 is arranged in a cutout 13 for the side portion 2, 3 and extends in a longitudinal direction of the side portions 2, 3.

The transverse elements 4 and 5 both have a flattened cross-section with rounded narrow sides over their entire length. One of the flat sides of the transverse elements 4 and 5 is provided with a groove 14 extending in the longitudinal direction of the transverse elements 4, 5. Furthermore, the transverse elements 4, 5 are provided with a plurality of bores 15. The pins 11 engage the two outwardly positioned bores 15 of the transverse element 5 upon insertion into the holding member 9 s that the transverse element 5 is fixedly connected in a transverse direction relative to the longitudinal extension of the chain member 1. The transverse elements 4 and 5 may be connected to the side portions 2 and 3 such that the groove 14 is inwardly or outwardly oriented.

Between the transverse elements 4, 5, a separating cross-piece 16 is provided which has U-shaped holders 17 at its upper and lower ends. Pins 18 for engagement with the bores 15 of the transverse elements 4, 5 are connected to the holders 17. The length of the pins 18 corresponds to the depth of the groove 14. In this manner, the separating cross-piece 16 is slidable in the longitudinal direction of the transverse elements 4, 5 when the transverse elements 4, 5 are attached to the side portions 2, 3 with the groove 14 facing inwardly. When the grooves 14 of the transverse element 4, 5 are outwardly oriented, the pins 18 of the separating cross-piece 16 engage the bores 15 of the transverse elements 4, 5 so that the separating cross-piece 16 is no longer slidable in the longitudinal direction of the transverse elements 4, 5. Of course, it is also possible to provide a plurality of separating cross-pieces 16 between the transverse elements 4, 5 of one chain member 1.

At the upper and lower narrow sides of the side portions 2. 3 gliders 19 are detachably mounted which may glide one on the other when the guide chain is bent and the upper portion of the guide chain is supported on the lower portion of the guide chain. The length of the gliders 19 is determined such that the distance between neighboring side portions 2, 2a is bridged. The gliders 9 are directly attached to the lower narrow sides of the side portions 2, 3 and indirectly connected to the upper narrow sides of the side portions 2, 3, that is, via the holding member 9 of the pivot joint 7.

Each glider 19 is plate-shaped, and the surface facing away from the narrow sides of the side portions 2, 3 is provided with two slanted portions 20 oriented in the longitudinal direction of the glider 19. At the underside of the glider 19 four catch elements 21 are provided which are insertable into respective cutouts 22 at the side portions 2, 3, respectively, at the holding member 9.

The relative pivot angle of neighboring chain members 1 is determined by stops 23, 24 and a stop insert 25. The stops 24 of the side portion 2 are arranged within a recessed portion 26 of the side portion 2 and are positioned along the longitudinal axis of the side portion 2. The stops 23 at one end of the side portion 2a are staggered about a displacement angle of 90° relative to the stops 24 at the other end of the same side portion 2a and positioned in a respective recessed portion 27. Accordingly, the connecting line between the stops 23 is perpendicular to the longitudinal axis of the side portion 2a, while the two other stops 24 are arranged on the longitudinal axis of the side portion 2a. The side portions 2, 3 have a rim 28 which encloses the recessed portion 26 whereby the outer diameter of the rim 28 is slightly smaller than the inner diameter of the circular recessed portion 27 which is engaged by the rim 28 upon assembly.

The stop insert 25, which is inserted into the respective recessed portions 26 and 27 between neighboring side portions 2 and 2a, is essentially disk-shaped. The stop insert 25 is provided with two diametrically oppositely arranged slots 29 and two diametrically oppositely arranged cutouts 30. The slots 29 have a width that corresponds to the width of the stops 23, respectively, 24 while the cutouts 30 are arc-shaped and determine the pivot angle of neighboring chain members 1. The cutouts 30 have a respective first and second abutment surface 31a, 31b the respective abutment surfaces 31a and 31b being diametrically oppositely arranged relative to one another at the stop insert 25. In the embodiment represented in the drawings, the first abutment surface 31a is staggered at a staggering angle of 90° in the mathematically positive direction relative to the adjacent slot 29. The angle between the abutment surfaces 31a and 31b in the represented embodiment is approximately 60°.

The stop inserts 25 have a central bore 32 through which respective pegs 33 arranged within the recessed portions 26, 27 penetrate. The side portions 2, 2a of neighboring chain members 1 are connected via connecting elements 34 whereby the stop inserts 25 are arranged in the recessed portions 26, respectively, 27 of the side portions 2, 2a such that the slots 29 enclose the stops 24. The stops 24 are provided with a slot 35 extending in a radial direction. With this arrangement, the stop insert 25 is fixedly connected within the side portions 2 and the stops 23 of the side portion 2a are guided within the diametrically oppositely arranged cutouts 30 of the stop insert 25. The relative pivoting angle between the chain members 1 is thus limited by the abutment surfaces 31a and 31b, the chain members being represented only by a respective side portion 2, 2a. Due to the arrangement of the abutment surface 31a at a right angle to the slots 29 and the special embodiment of the cutout 30, the neighboring chain members 1 may be pivoted from their stretched position i n only one direction about an angle that corresponds to the angle delimited by the abutment surfaces of the cutout 30. In order to change the pivoting direction of the chain members 1 relative to one another, it is now only necessary to insert the stop insert 25, rotated 180° about its axis x or y, into the recessed portion 26, 27.

For displaying the pivoting direction and the pivoting angle, the stop inserts 25 which are comprised of a plastic material are provided with markings 36 which are visible through respective openings 37 within the side portions 2, 3, 2a.

Figure 2:
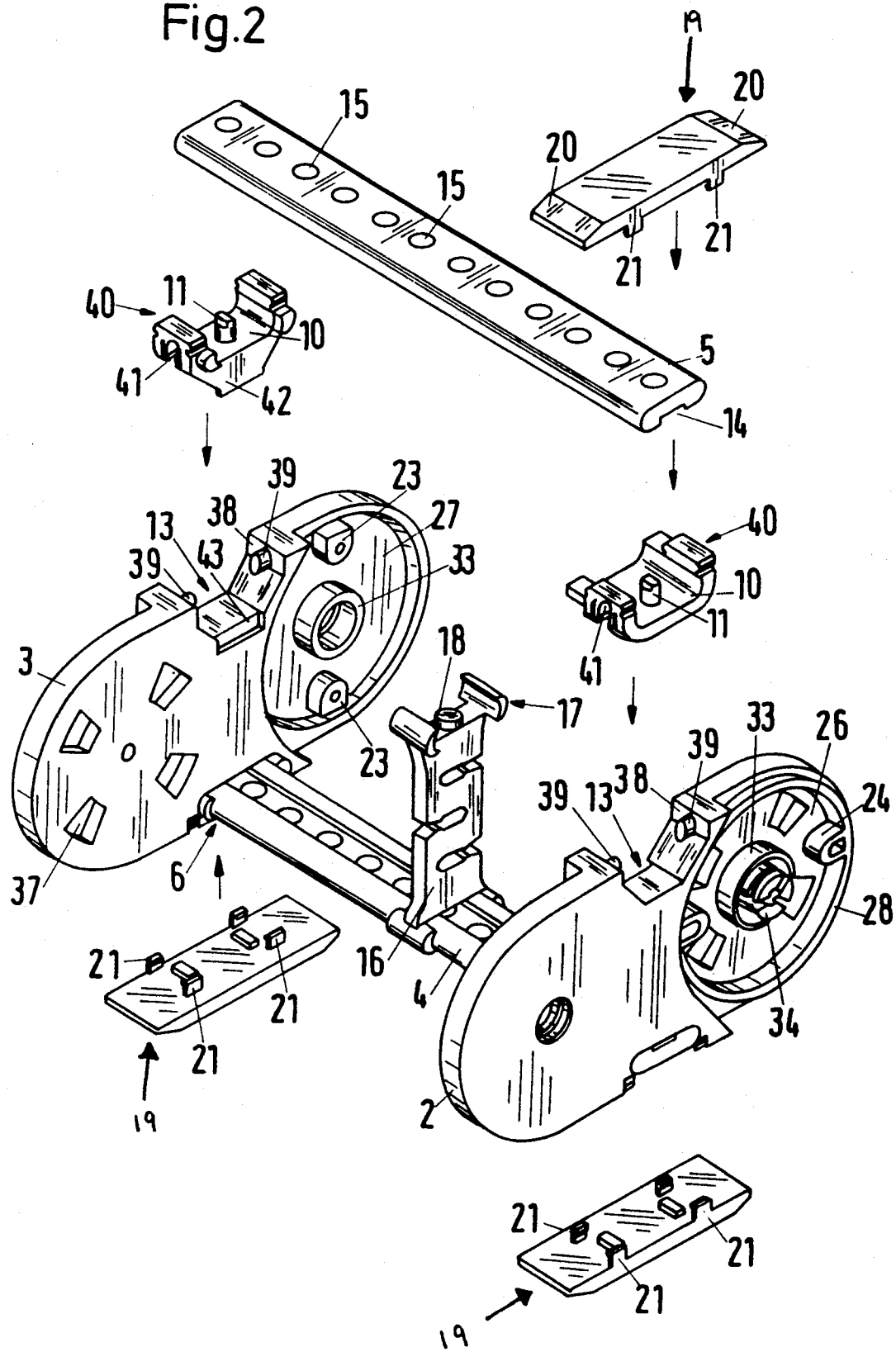
FIG. 2 is a guide chain showing a second embodiment of the pivot joint in a perspective exploded view.

In the embodiment represented in FIG. 2 the oppositely arranged inner surfaces 38 of the V-shaped cutouts 13 are provided with two fastening lugs 39. Holding members 40 are pivotably inserted into the V-shaped cutouts 13, whereby the holding members 40 are provided with cutouts 41 having undercuts and corresponding to the fastening lugs 39.

The holding member 40 at its side that is facing the energy line channel, is V-shaped so that it completely fills the V-shaped cutout 13. The holding member 40, at its outwardly oriented side, is U-shaped so that between the holding member 40 and the V-shaped cutout 13 a slot is generated. As can be seen especially from FIGS. 3 to 5, the holding member 40 has an extension 42 which engages a corresponding step 43 in the cutout 13. This step 43 serves as an abutment surface. In assembling the chain members, the holding member 40 is inserted such that the extension 42 contacts the step 43 so that the holding member 40 assumes a defined position for the insertion of the transverse element 5.

The holding member 40 is shown in detail in FIGS. 7 to 9. It may be taken from the drawings that the underside 44 of the holding member 40 which is facing the side portions 2, 3 is in the form of an arc segment. This arc segment is provided at the end of the holding member 40 which is opposite the extension 42. FIG. 11 shows the cutout 41 with undercut 45. The undercut 45 within the cutout 41 fastens the holding member 40 to the fastening lugs 39 so that an accidental opening of the chain member 1 is prevented. An easy opening of the chain member is achieved by providing an holding member 40 made of a permanently elastic plastic material. The elasticity of the holding member 40 which is required for opening and closing the chain member 1 is improved by providing slots 46 parallel to the cutouts 41. These slots 46 enable the undercut 45 to flex during the clamping step and during the removal of the holding member 40 from the fastening lugs 39.

As can be seen especially in FIG. 7, the holding member 40 is provided with a U-shaped cutout 10 with undercuts into which the transverse element 5 is inserted. A pin 11 is arranged in this cutout 10 which engages a corresponding bore 15 in the transverse element 5. Projections 47 are provided which extend in the longitudinal direction of the transverse element and which serve to guide the transverse element 5 at both sides of the cutout 10.

FIG. 12 represents the side portions 2, 3 with inserted holding members 40. In the position represented, the extension 42 of t he holding member 40 engages the step 43. The chain member 1 is closed by the transverse element 5 which is not represented in FIG. 12. In FIG. 13, the arrow 48 indicates the pivoting of the holding member about an angle of 90°. The arrow 49 in FIG. 14 indicates the pivoting of the holding member 40 about an angle of 180° relative to the position of FIG. 12.

The present invention is, of course, in no way restricted to the specific disclosure of the specification and drawings, but also encompasses any modifications within the scope of the appended claims.

What we claim is:

1. A guide chain for guiding energy lines from a stationary connection to a movable consuming device, said guide chain comprising:
    a plurality of chain members being pivotably connected to one another, each one of said chain members being comprised of:
    two side portions arranged at a distance parallel to one another;
    two transverse elements connecting said side portions with one another;
    at least two pivot joints, a first one of said pivot joints fastened to a first one of said side portions and a second one of said pivot joints fastened to a second one of said side portions, for pivotably connecting at least one of said transverse elements to said side portions, said pivot joints each comprising a lug element, extending in a longitudinal direction of said side portions and forming a pivoting axis of said pivot joint, and a holding member connected in a detachable manner to said lug element, said holding member having a U-shaped cutout with undercuts for receiving said transverse element, said transverse element being inserted into said U-shaped cutout with a rotating movement.

2. A guide chain according to claim 1, wherein said side portions have a V-shaped cutout in which said lug element is arranged.

3. A guide chain according to claim 1, wherein said holding member is V-shaped and has a spring clip at a bottom side thereof for fastening said holding member to said lug element.

4. A guide chain according to claim 1, wherein said holding member is outwardly pivotable about said lug element relative to said chain member at an angle of greater than 90°.

5. A guide chain according to claim 1, wherein said side portions have V-shaped cutouts and wherein said lug element is comprised of two individual fastening lugs attached to opposite inner surfaces of said V-shaped cutout, with said holding member having two recesses with undercuts corresponding to said fastening lugs.

6. A guide chain according to claim 5, wherein said holding member is U-shaped.

7. A guide chain according to claim 6, wherein said holding member further comprises an extension and said cutout further comprises a step, said extension engaging said step.

8. A guide chain according to claim 5, wherein an underside of said holding member, said underside facing said side portion, has a contour corresponding to an arc segment.

9. A guide chain according to claim 5, wherein said holding element is pivotable about said fastening lugs at an angle of between 90° and 240°.

10. A guide chain according to claim 9, wherein said angle is 180°.

11. A guide chain according to claim 1, further comprising a pin attached to said U-shaped cutout of said holding member, and wherein said transverse elements have bores, said pin engaging one of said bores of said transverse elements.

* * * * *